M. W. FAHERTY.
GATE OPERATING MECHANISM FOR MEAL COOKERS AND ANALOGOUS APPARATUS.
APPLICATION FILED JUNE 8, 1914.
1,112,128.
Patented Sept. 29, 1914.
2 SHEETS—SHEET 1.
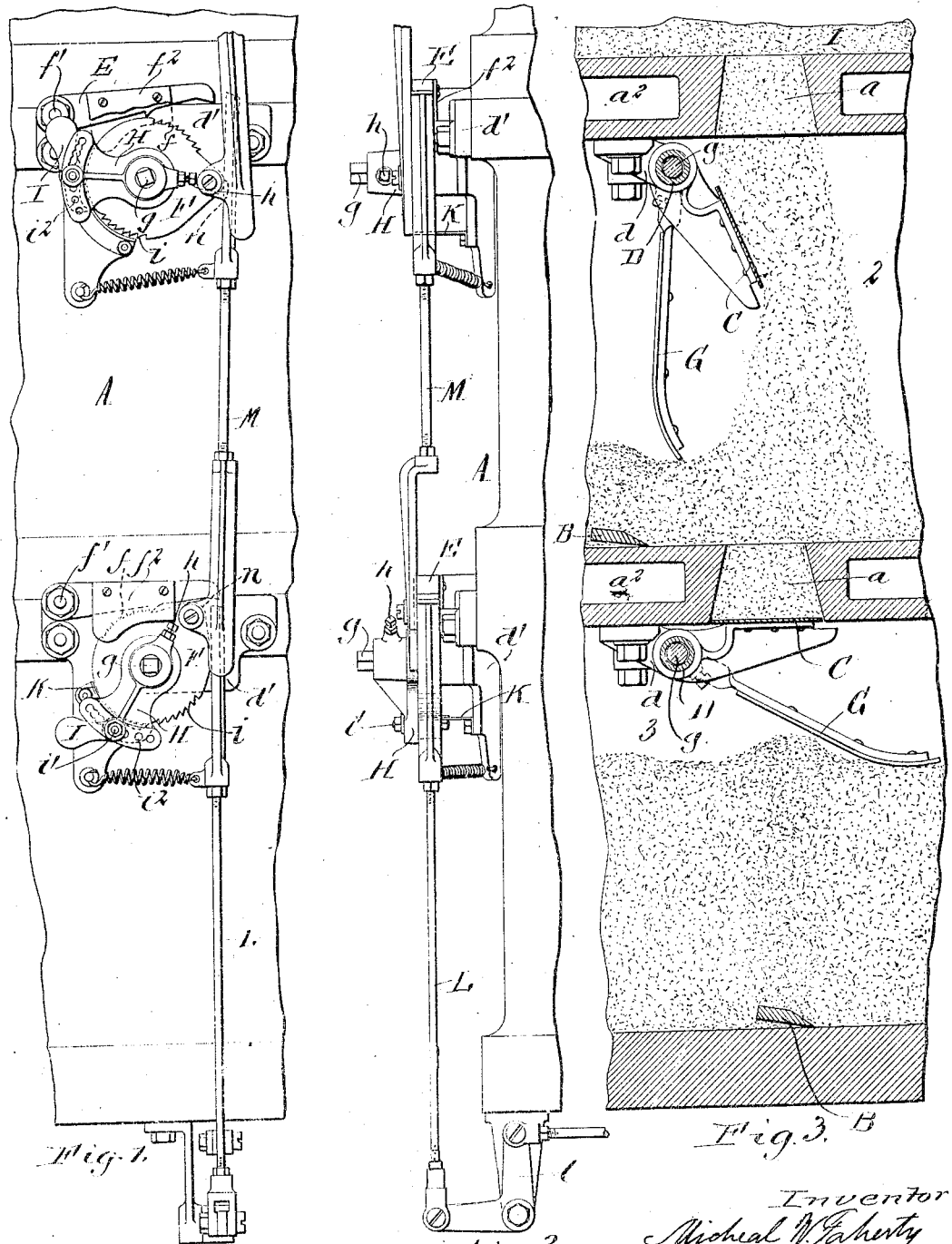

M. W. FAHERTY.
GATE OPERATING MECHANISM FOR MEAL COOKERS AND ANALOGOUS APPARATUS.
APPLICATION FILED JUNE 8, 1914.
1,112,128.
Patented Sept. 29, 1914.
2 SHEETS—SHEET 2.
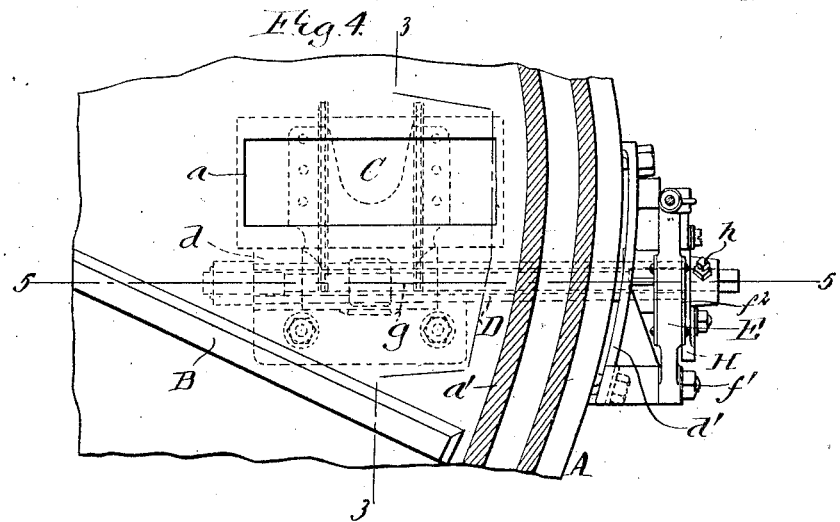
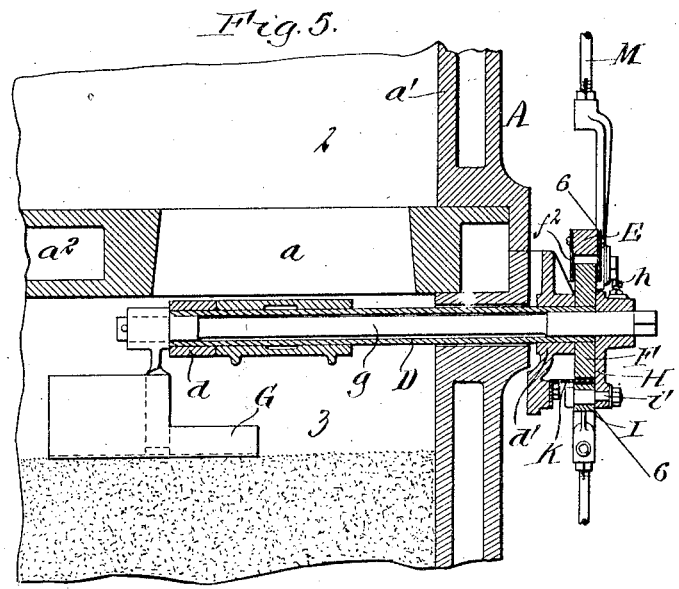
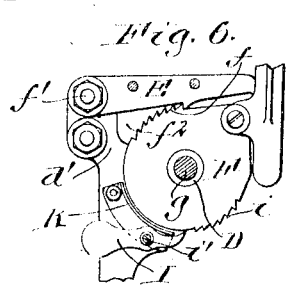
Witnesses:—
Richard Sommer
A. G. Dimond
Inventor
Micheal W. Faherty
by Wilhelm & Parker,
Attorneys.

UNITED STATES PATENT OFFICE.

MICHAEL W. FAHERTY, OF MEMPHIS, TENNESSEE, ASSIGNOR TO THE FRENCH OIL MILL MACHINERY COMPANY, OF PIQUA, OHIO.

GATE-OPERATING MECHANISM FOR MEAL-COOKERS AND ANALOGOUS APPARATUS.

1,112,128.  Specification of Letters Patent.  Patented Sept. 29, 1914.

Application filed June 8, 1914. Serial No. 843,633.

*To all whom it may concern:*

Be it known that I, MICHAEL W. FAHERTY, a citizen of the United States, residing at Memphis, in the county of Shelby and State of Tennessee, have invented a new and useful Improvement in Gate-Operating Mechanisms for Meal-Cookers and Analogous Apparatus, of which the following is a specification.
This invention relates to cookers for oil-bearing meal, driers, and analogous apparatus having a plurality of chambers which are arranged to permit the material to discharge from chamber to chamber and are provided with gates which control the delivery of the material from one chamber to the next in such a way as to regulate the quantity of the material in the several chambers and the length of time required for its passage through the apparatus.

More particularly the invention relates to improvements in apparatus, such, for example, as disclosed in Patent No. 1,091,055, granted to A. W. French March 24, 1914, in which the gate for one chamber is closed by a float or device actuated by the material accumulating in the next, or receiving chamber, and is secured, when closed, by a latch which is released to permit the gate to open.
One object of this invention is to produce an efficient and practical gate-operating mechanism of novel construction which will close the gate promptly and positively when the material reaches a predetermined depth in the receiving chamber, and which can be readily adjusted to regulate, as may be desired, the depth to which the material is permitted to accumulate in any one or more of the chambers.
Another object of the invention is to construct the gate-operating mechanism so that when the material reaches a predetermined depth in a chamber, the gate controlling the delivery of material thereto will be closed by the motion of the material in the chamber caused by the stirrers without the further delivery of material to the chamber.

In the accompanying drawings: Figure 1 is a fragmentary elevation of a meal cooker showing operating mechanism embodying the invention for two of the gates thereof. Fig. 2 is a fragmentary side elevation thereof. Fig. 3 is a sectional elevation thereof in line 3—3, Fig. 4. Fig. 4 is a fragmentary sectional plan view thereof. Fig. 5 is a sectional elevation thereof in line 5—5, Fig. 4. Fig. 6 is a sectional elevation of the operating mechanism in line 6—6, Fig. 5.

A represents a portion of an oil-meal cooker or analogous apparatus comprising a series of chambers 1, 2, 3, arranged so that the material can discharge by gravity from one chamber to another through discharge openings $a$ in the bottoms of the chambers. There may be any desired number of the chambers, and they may be of any suitable construction. The apparatus illustrated in the drawings is intended for cooking oil-bearing meal preparatory to expressing the oil therefrom, and the side walls $a'$ and bottoms $a^2$ of the chambers are made hollow to receive steam for cooking the material.

B indicates an arm or sweep, such as ordinarily used in meal cookers, which rotates in the lower portion of each chamber for stirring the material. The rotation of this stirrer produces a sort of wave or ridge on the surface of the material which follows the motion of the stirrer, and is made use of, as hereinafter explained, in closing the gate for the discharge opening.

The material can be discharged or withdrawn from the bottom chamber 3 in any convenient way, depending upon the use for which the apparatus is intended. In the case of oil-meal cookers the material is ordinarily withdrawn from the bottom chamber intermittently in measured quantities suitable for forming cakes for introduction into the oil expressing presses. Each of the other chambers is provided with a gate C, controlling the discharge opening $a$ thereof, which is preferably hinged so as to open downwardly into the next chamber below. As in said patented apparatus, each gate is swung upwardly by a device which floats or rides on the material accumulating in the chamber into which the gate opens, and closes the gate when the material reaches a predetermined depth, and the gate remains closed until a latch which holds the same is released. In the present apparatus, however, the float or closing device actuates the gate through the medium of a ratchet or similar mechanism which permits the float to oscillate relative to the gate and close the gate by successive or intermittent movements. In the construction shown in the drawings, the gate C is secured to a hollow hinge shaft D which is supported and adapted to turn in a bearing $d$ on the bottom of the chamber which it controls and in a bearing plate $d'$ secured exteriorly on the side of the apparatus.

E represents the latch which is adapted to engage teeth $f$ on the edge of a ratchet disk F fixed to the outer end of the hinge shaft D for holding the gate in the position to which it is raised by the closing device. The latch E shown is suitably pivoted at one end by a screw $f'$ to the bearing plate $d'$ and is held by gravity in contact with the edge of the ratchet disk F. Side plates $f^2$ secured to the latch and straddling the edge of the ratchet disk hold the latch in proper position over the disk. The ratchet disk F is provided with a number of the teeth $f$, instead of with only one as in said patented apparatus, and the latch engages one tooth after another as the gate is raised and thus acts to hold the gate in the successively higher positions to which it is lifted by the closing device. A latch device of any other construction adapted to thus retain the gate in the successive positions to which it is lifted could be employed.

G represents the closing device or float which rides or floats on the material accumulating in one chamber for closing the gate of the chamber above. This float or device is preferably fixed to the inner end of a shaft $g$ that extends lengthwise through the hollow hinge shaft D for the gate and is provided at its outer end with a pawl carrier or arm H on which is mounted a pawl I adapted to engage teeth $i$ on the ratchet disk F, whereby the upward movement of the closing device G, caused by the accumulating material, is transmitted to the gate for swinging it upwardly. The pawl carrier H is preferably secured to the shaft $g$ by a set screw $h$ or other means permitting an angular adjustment of the pawl carrier on the shaft. The pawl shown is of the pivoted gravity-actuated sort which has a weighted end by which it is caused to engage the teeth of the disk F, and the pivot $i'$ of the pawl is adapted to be secured in any one of a series of holes $i^2$ in the pawl carrier for adjusting the pawl on the pawl carrier to regulate the closing of the gate as hereinafter explained, but an adjustable pawl of any other suitable sort could be employed.

K represents a curved plate or shield which surrounds a portion of the edge of the ratchet disk F and on which the pawl is adapted to slide, for holding the pawl out of operative engagement with the teeth $i$ of the ratchet disk F after a predetermined preliminary upward movement of the float or device G. The shield K shown is stationarily secured to the bearing plate $d'$.

When the gate C is open the float or device G will hang downwardly in a more or less vertical position, as shown in the upper part of Fig. 3, and the pawl I will be held by the shield K out of engagement with the teeth $i$ of the ratchet disk F. The material can then flow freely through the discharge opening $a$ of the chamber controlled by the gate into the chamber below. The float or device G rides on the surface of the material in the lower chamber and gradually swings upwardly as the depth of the material increases, but the gate remains stationary in its wide open position until the float or device G is raised high enough to move the pawl I off of the shield K and into engagement with the first tooth $i$ of the ratchet disk F. In any further upward movement of the float or device G the pawl will turn the ratchet disk F and gate shaft D, thereby swinging the gate upwardly. After the float or device G has been thus raised high enough to bring the pawl into action, each time one of the sweeps or stirrers B passes beneath the float the surface wave or ridge in the material, caused by the sweep, lifts the float upwardly a short distance and, through the pawl and ratchet, produces a corresponding upward movement of the gate C. When the float falls again after the wave passes it, the gate will be retained in the raised position by the latch E and the gate will therefore be lifted higher, a distance corresponding to one or more of the ratchet teeth, each time that the float is raised by the wave until the gate is completely closed. Thus after the level of the material has risen high enough to bring the pawl I into action the gate will be raised, without the necessity for any further rise in the level of the material, by the intermittent movements produced by the action of the waves on the float until the gate is fully closed. The gate therefore remains wide open and permits a free discharge of the material until the desired depth is attained, and is then promptly and positively closed.

The teeth $i$ are preferably so located on the ratchet disk that the first tooth will be just in front of the shield ready to be engaged by the pawl I when the gate is wide open, and that the gate will be closed tightly when the pawl has moved the ratchet by engagement with the last tooth. Consequently if the oscillation of the float or device G by the waves continues after the gate has been shut tight, the pawl will oscillate idly without injury to the mechanism.

By adjusting the pawl I forwardly or backwardly on the pawl carrier H, relative to the shield K, it can be brought into action by a less or greater upward movement of the float, so that the depth to which the material accumulates can be regulated as desired by a proper adjustment of the pawl. The pawl can also, if desired, be adjusted relative to the shield by adjusting the pawl carrier H to different angular positions on the float shaft $g$.

The latches E can be released to allow the gates C to open and discharge the material from one chamber to another in the desired order and at suitable intervals by any suitable manually or automatically operated means. Preferably the latches are tripped by the following mechanism, which is like that disclosed in the before-mentioned patent:

L represents a trip rod connected to a lever $l$ and adapted to engage and release the latch E of the first gate C. The lever $l$ can be actuated by hand. Pivoted to the ratchet disk F for this first gate is a trip rod M for the latch of the next gate above. When the first gate is closed the rod M engages and releases the latch for the second gate. In a like manner the latch for the third gate is released by a trip rod connected to the ratchet disk of the second gate, each gate thus acting, when closed, to trip the latch for the next gate above. When a gate swings open an eccentric portion $n$ on its ratchet disk moves the trip rod from beneath the latch for this gate so as to render the latch operative to hold the gate when it is again closed.

I claim as my invention:

1. The combination with a plurality of chambers arranged to permit material to discharge from one chamber into another, and a gate which controls the discharge of the material from one chamber to the other, of a device for closing said gate, the action of which is governed by the quantity of material in the receiving chamber, and ratchet mechanism through which said closing device actuates the gate.

2. The combination with a plurality of chambers arranged to permit material to discharge from one chamber into another, and a gate which controls the discharge of the material from one chamber to the other, of a device for closing said gate, the action of which is governed by the quantity of material in the receiving chamber, and mechanism operated by said closing device for closing said gate by successive intermittent movements.

3. The combination with a plurality of chambers arranged to permit material to discharge from one chamber into another, and a gate which controls the discharge of the material from one chamber to the other, of a device for closing said gate, automatic means which set said closing device in action, and mechanism operated by successive movements of said closing device for closing said gate.

4. The combination with a plurality of chambers arranged to permit material to discharge from one chamber into another, and a gate which controls the discharge of the material from one chamber to the other, of a device actuated by the material accumulating in the receiving chamber for closing said gate, and mechanism operated by successive movements of said closing device for closing said gate.

5. The combination with a plurality of chambers arranged to permit material to discharge from one chamber into another, and a gate which controls the discharge of the material from one chamber to the other, of a device actuated by the material accumulating in the receiving chamber for closing said gate, and ratchet mechanism operatively connecting said closing device to said gate.

6. The combination with a plurality of chambers arranged to permit material to discharge from one chamber into another, and a gate which controls the discharge of the material from one chamber to the other, of a device for closing said gate which is caused to oscillate by the material accumulating in the receiving chamber, and mechanism operated by successive movements of said closing device for closing said gate.

7. The combination with a plurality of chambers arranged to permit material to discharge from one chamber into another, and a gate which controls the discharge of the material from one chamber to the other, of a device for closing said gate which rides on the material accumulating in the receiving chamber, means for causing a wave in the material for oscillating said closing device, and means operated by the oscillation of said closing device for closing the gate.

8. The combination with a plurality of chambers arranged to permit material to discharge from one chamber into another, and a gate which controls the discharge of the material from one chamber to the other, of an automatically operated closing device for said gate, ratchet mechanism operatively connecting said closing device to said gate, and means for varying the action of said ratchet mechanism to regulate the depth of the material in the receiving chamber.

9. The combination with a plurality of chambers arranged to permit material to discharge from one chamber into another, and a gate which controls the discharge of the material from one chamber to the other, of an automatically operated closing device for said gate, ratchet mechanism operatively connecting said closing device to said gate, and a latch for retaining the gate in the position to which it is moved by said closing device and ratchet mechanism.

10. The combination with a plurality of chambers arranged to permit material to discharge from one chamber into another, and a gate which controls the discharge of the material from one chamber to the other, of a device actuated by the material accumulating in the receiving chamber for closing said gate, ratchet mechanism operatively connecting said closing device to said gate, and a latch for retaining the gate in the position to which it is moved by said closing device and ratchet mechanism.

11. The combination with a plurality of chambers arranged to permit material to discharge from one chamber into another, gates which control the discharge of material from said chambers, closing devices for said gates, ratchet mechanisms operatively connecting said closing devices to said gates, and means controlled by the ratchet mechanism for one gate for releasing another gate.

12. The combination with a plurality of chambers arranged to permit material to discharge from one chamber into another, gates which control the discharge of material from said chambers, closing devices for said gates, ratchet mechanisms operatively connecting said closing devices to said gates, latches for retaining said gates closed, and means controlled by the ratchet mechanism for one gate for releasing the latch for another gate.

13. The combination with a plurality of chambers arranged to permit material to discharge from one chamber into another, gates which control the discharge of material from said chambers, and intermittently operating automatic mechanism for closing said gates in succession.

14. The combination with a plurality of chambers arranged to permit material to discharge from one chamber into another, gates which control the discharge of material from said chambers, intermittently operating automatic mechanism for closing said gates in succession, and mechanism for causing said gates to open in succession.

15. The combination with a plurality of chambers arranged to permit material to discharge from one chamber into another, and a gate which controls the discharge of the material from one chamber to the other, of a device which is lifted by the material accumulating in the receiving chamber and is oscillated by the material, a pawl which is oscillated by said device, a ratchet disk which is connected to said gate and is moved by said pawl, and a shield which holds said pawl off of said ratchet disk until the material accumulates to a predetermined depth in the receiving chamber.

16. The combination with a plurality of chambers arranged to permit material to discharge from one chamber into another, and a gate which controls the discharge of the material from one chamber to the other, of a device which is lifted by the material accumulating in the receiving chamber and is oscillated by the material, a pawl which is oscillated by said device, a ratchet disk which is connected to said gate and is moved by said pawl, and a shield which holds said pawl off of said ratchet disk until the material accumulates to a predetermined depth in the receiving chamber, said pawl being adjustable to different positions relative to said ratchet disk.

Witness my hand, this 2nd day of June, 1914.

MICHAEL W. FAHERTY.

Witnesses:
WHARTON S. JONES,
BERTHA H. CARRIGAN.